United States Patent [19]

Luger

[11] 3,999,063
[45] Dec. 21, 1976

[54] OPTICAL MEASURING SYSTEM WITH DIGITAL ELECTROMETER SCALER

[75] Inventor: Paul P. Luger, Spokane, Wash.

[73] Assignee: The Pioneer Educational Society, Portland, Oreg.

[22] Filed: Mar. 27, 1972

[21] Appl. No.: 238,574

Related U.S. Application Data

[63] Continuation-in-part of Ser. No. 32,578, Aug. 28, 1970, Pat. No. 3,875,410.

[52] U.S. Cl. .......................... 250/231 R; 250/376
[51] Int. Cl.² ........................................ G01D 5/34
[58] Field of Search .............. 250/231, 376; 324/97

[56] References Cited
UNITED STATES PATENTS

| | | | |
|---|---|---|---|
| 2,368,093 | 1/1945 | Asset et al. | 324/97 |
| 2,986,697 | 5/1961 | Luger | 250/231 R X |
| 3,384,750 | 5/1968 | Owen | 250/231 R X |

*Primary Examiner*—Archie R. Borchelt

[57] ABSTRACT

An optical measuring system is described for automatically operating an electrometer. A binant electrometer is employed with a quartz fiber mounted at one end but free to vibrate at the other in an AC field. The fiber oscillates if a charge is placed upon it. An optical slit replaces the ordinary eyepiece reticule scale. With the quartz fiber adjusted so its image is in focus at the optical slit, photoelectric signals are obtained at null charge on the fiber. The quartz fiber is repeatedly charged and allowed to discharge by collecting ions from a source under measurement. Each photoelectric signal causes a digital time reading to be taken. The time readings are used to evaluate the current due to the collected charge. The photoelectric signals, by feedback, also operate the electrometer for continuous or intermittent-continuous operation. Basically the system is a current digitizer. The method is applied to the measurement of force in other types of fields.

15 Claims, 16 Drawing Figures

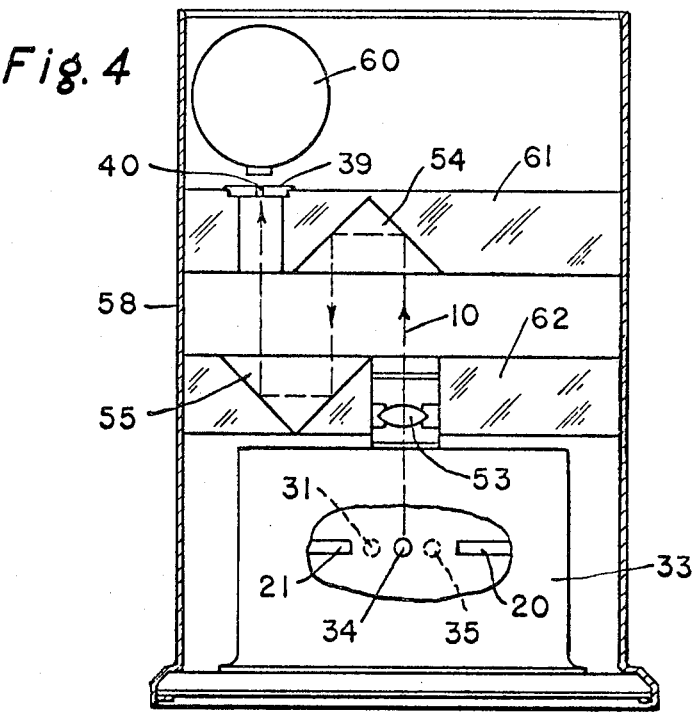
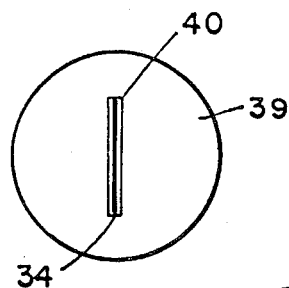
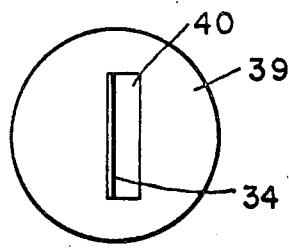
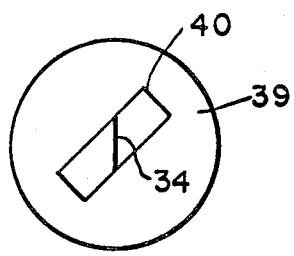
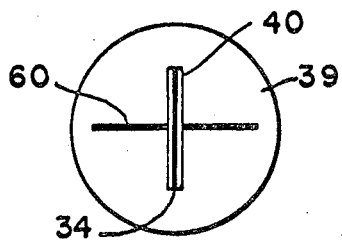
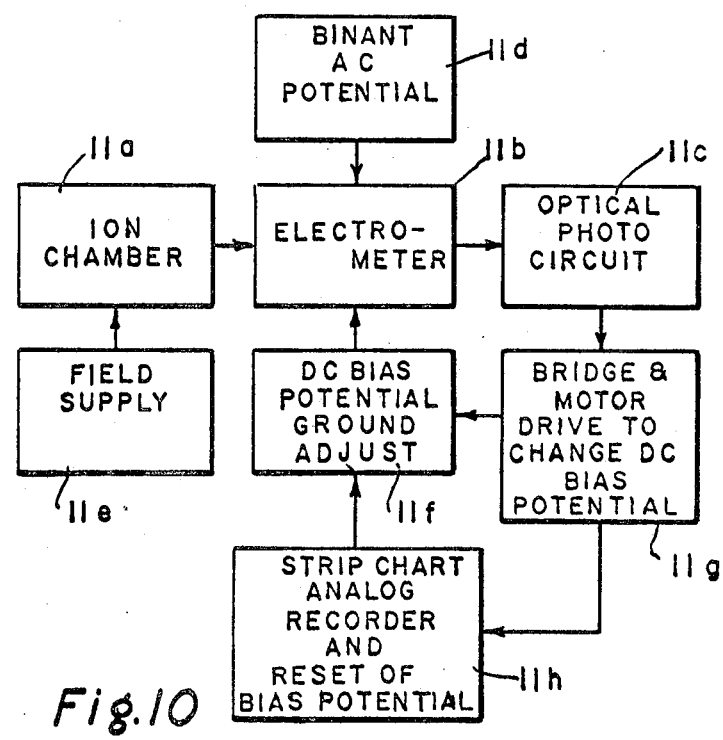

OPTICAL MEASURING SYSTEM WITH DIGITAL ELECTROMETER SCALER

This invention is a continuation-in-part of a previous patent entitled: RADIATION DETECTOR USING A DIGITAL ELECTROMETER SCALER, Ser. No. 32,578, Aug. 28, 1970, U.S. Pat. No. 3,875,410.

Other continuations-in-part are the following: Ser. No. 404,180, Apr. 9, 1973, entitled: NUCLEAR REACTOR AND PRODUCTION SYSTEMS WITH A FLUX-OPTICAL DIGITIZER, and, Ser. No. 610,190, Sept. 4, 1975, entitled: CHEMICAL REACTION AND PRODUCTION SYSTEMS WITH A SPECTRO-OPTICAL DIGITIZER.

This invention relates to deflection instruments and their use for the measurement of various kinds of forces; in particular it relates to an improved method and means for the continuous monitoring and recording of the phenomena measured by such instruments.

In certain respects this application is similar to a former publication, U.S. Pat. No. 2,986,697. However, it contains substantial improvements and innovations beyond those described in the earlier patent.

In many deflection instruments, the forces deflecting the movable element are subject to a field of force of one kind or another; where the relationship between the field and the forces or between the forces themselves are known, measurements may be undertaken. For example, when an electrostatic field of force controls the movement of a member that is collecting an electric change, an electric current may be measured. Known physical laws relate the current and the rate of deflection of the movable element in such instruments.

More in particular, it is often desirable to use a quartz fiber electrometer in conjunction with an ionization chamber for radiation measurements. A well-designed electrometer is sufficiently accurate to be employed as a secondary standard but requires operator observation of the rate of deflection of the electrometer needle. The need for continuous operator attention has inhibited use of an electrometer for routine measurements despite many desirable characteristics.

It is therefore the primary object of this invention to provide an improved method for the automatic monitoring of the phenomena measured by these deflection instruments.

It is another object of this invention to provide a measuring device in which continuous sensitivity monitoring is not required. Hence the special apparatus for sensitivity measurements described in the earlier patent publication is no longer necessary when the novelties of this new invention are employed.

It is a further object of this invention to provide an instrument that may be used as an analog to digital converter.

These and other objects of the invention are practiced, generally speaking, by providing a deflection instrument having a movable element in a field of force. If the field is electric the forces will be produced by electric charges of opposite sign, supplied to the moving element. Also associated with this instrument is a source of illumination and an optical system adjusted to forcus the real image of the deflection element (usually provided in the form of a needle clamped at one end and free to vibrate at the other) upon an optical mask having one slit thereon. A photoelectric cell is either mounted behind the slit or is connected to the slit by means of fiber optics so that signals may be generated when the deflection element is in a null condition. The signals generated through the instrumentality of the real-image-optical-slit-photocell arrangement are then employed both to operate a feedback control for the instrument itself, as well as to control digital time counters and recorders, thus to store in memory digital information of the rate of change of the potential of the needle due to the charge accumulating thereon.

In employing such a unit of invention in connection with an ion chamber and a quartz fiber needle electrometer for the measurement of radiation, the "rate of charge" or "drift" method is employed and currents of less than about $10^{-16}$ ampere may be measured.

In the device first to be described, time is the dependent variable and is the principal quantity under measurement. Independent variables, such as voltage, may be set by control nobs or are variables to be measured, as is the electric current with quartz fiber electrometers. Constants are either built into the device or are set by controls. As a result, all measurements appear as digital, time-interval readings. This makes it natural for automatic readout as on a tape or card together with visual display of the reading if desired.

The arrangement thus generally described provides for fully automatic operation of the scaler or digitizer eliminating the necessity for attendance by a trained operator. As a digitizer the instrument makes possible the change of information from analog to digital form. Another important object of this invention is to describe an automatic method of taking current measurements with an electrometer on a continuous basis.

This is possible since the time required for sensitivity measurements is completely eliminated and the dead time between measurements may be a minimum, constant time interval, (less than a second). Thus all measurements can be made in real time. This is important if periods or half lives are to be determined.

A further object of this invention is to apply this digitizing, flux-measuring equipment to the control of a nuclear reactor. Not only does such a digitizer afford a means of obtaining reactor flux levels at several places simultaneously in the core lattice, and at frequent, almost continuous intervals, but these readings may be further applied to the automatic control of the reactor's power output.

It is also the object of this invention to employ rotating arm or deflecting arm instruments as optical, analog-to-digital converters. In these instruments the real image of the deflecting arm may be used to derive time interval measurements in an optical slitphototransducer system; or the moving arm itself may cause the interruption of optical flux incident upon the optical slit-phototransducer arrangement. Such devices may be used as rate of production indicators.

Before entering upon a description of the drawings a short review of the photoelectric art and the place this invention occupies in the general picture of the art will be set forth.

The photoelectric effect is a phenomenon in which photons of light falling on materials, usually metals, release electrons. The photons must have an energy at least equal to the "work function" of the metal or substance. The released electrons are called photoelectrons.

A photoelectric circuit is a circuit employing the photoelectric effect and designed to collect and conduct the photoelectrons and thus employ them for some useful purpose. The photoelectric circuit contains an electric potential and employs a device called a photocell or light transducer wherein the photoelectrons are collected by the potential to an anode. The circuit may be designed for the operation of various devices either for the purpose of measurement or control. Thus by means of a relay, or a bridge or a transformer or solid devices or by a combination of these and possibly other devices, control or measurement is brought about.

The photoelectric circuit in conjunction with some method of light flux (or photon) modulation is able to effect, as a useful "output", control of devices external to its own circuit, as, for example, the measurement of various quantities as will be shown in the applications of this invention later to be described.

There are various ways in whch a beam of light (i.e., photons) may be modulated so that the flow of electrons in the photoelectric circuit may be controlled and thus be made useful for measurement and control devices external to itself.

Here we list five ways of modulating light flux to obtain photoelectric signals:

1. The light flux source itself may be turned off and on thus controlling current in the photoelectric circuit.

2. While the light source is on continuously, a material object obstructs the beam of light either by its umbra or penumbra thus preventing light flux either fully or partially from reaching the photosensitive surface of the photocell and thus controlling current in the photoelectric circuit.

3. Again, while the light source itself is left on continuously the beam of light flux is deflected with a mirror so as to be partially or fully removed from the photoelectric surface, thus controlling current in the photoelectric circuit.

4. Another means of modulating a beam of light incident upon a photocell is by means of the real image of an object which real images is constrained to move in the focal plane of a lens focusing system. In this focal plane a mask is placed containing an optical slit through which the light beam passes on its way to the photocell transducer. Thus the real image of the object being adjusted to overlap the optical slit becomes capable of moduating light flux to control current in the photoelectric circuit as often as the image of the object moves into a position overlapping the optical slit. This method is described in U.S. Pat. No. 2,986,697.

5. A further method of modualting a beam of light flux is to employ an object or its real image; the object is either in vibration or rotating, or in periodic motion and thus produces light modulation which in turn causes a photoelectric signal which is both time-duration dependent and frequency-amplitude dependent.

The real image or object, when not in vibration, is adjusted to be in overlapping relationship to an optical slit or aperture contained in a mask in the focal plane of an optical focusing system and so adjusted that the beam of flux reaches the photocell unit by means of the aperture. But the condition for modulation in this arrangement is found in the amplitude of the frequency of vibration of the image, or simply in the frequency. At high frequencies and large amplitudes no signal is produced in the photoelectric circuit even through the real image crosses the aperture twice in each vibration period. But for sufficiently low frequencies or low amplitudes of vibration a photoelectric signal is produced because of the time-duration of the overlapping of the slit by the object or its real image.

Here then, we have a beam of light flux which may be modulated (1) by the changing frequency of vibration of an object or its real image at an optical aperture thus producing a signal in a photoelectric circuit, or (2) by modulation that results from a decrease in amplitude of vibration of an object or its real image at an aperture thus producing a photoelectric signal. In either case, however, it is time duration of the light flux diminution at the optical slit, produced by the object itself or its real image with this type of light flux modulation, that makes the photoelectric signal time-duration dependent, either because of frequency dependence or amplitude dependence or both. We refer to such a photoelectric or transducer signal as being frequency-amplitude dependent. Thus either a frequency or amplitude change, with this type of modulation, is the cause of the photoelectric signal. Thus the photoelectric signal is said to be responsive or sensitive to amplitude and/or frequency changes.

The following description and accompanying drawings will more fully describe the purpose of this invention:

Figure 3:
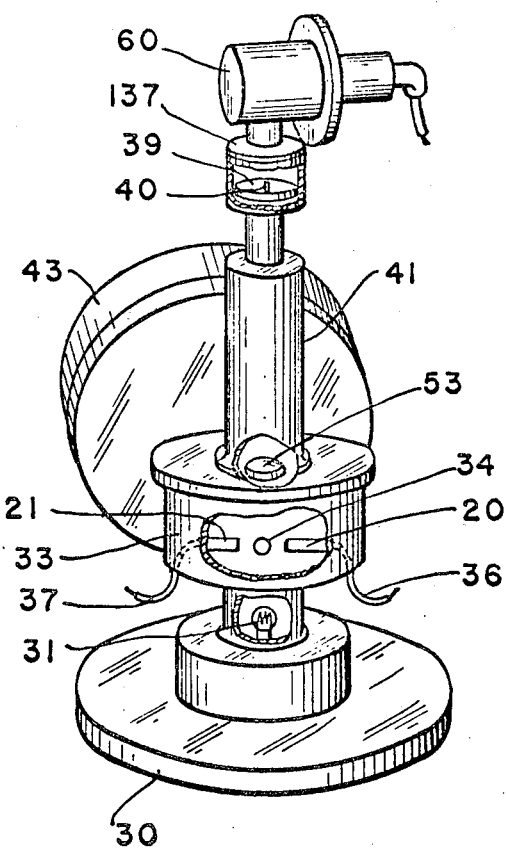

FIG. 3 indicates the general arrangement of one form of apparatus embodying the invetion.

FIG. 4 illustrates the optic associated with the electrometer in an embodiment of the invention.

FIG. 5 illustrates an optical slit with the needle in a nulled, i.e., equilibrium position.

FIG. 5A illustrates a mechanical, adjustable optical slit, opened for adjustment purposes.

FIG. 5B illustrates the same optical slit shown in FIG. 5A but rotated so as to further facilitate adjustment.

FIG. 6 shows a fixed optical slit together with an auxiliary slit useful for making optical alignment adjustments.

Figure 7:
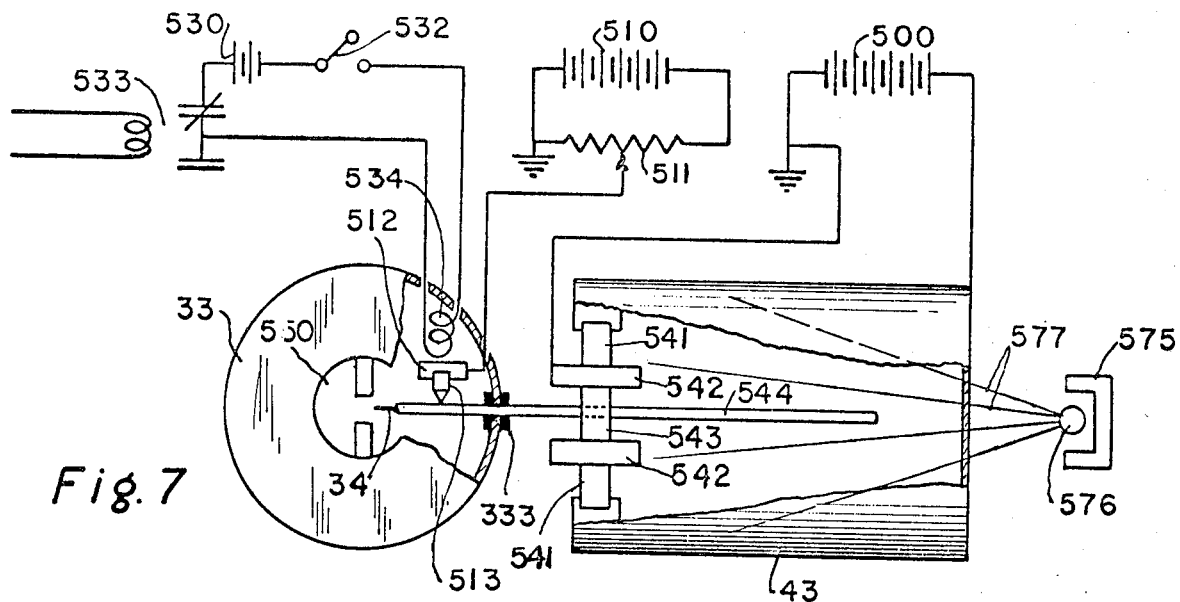

FIG. 7 illustrates an arrangement of electrical circuits useful in the practice of the invention.

Figure 8:
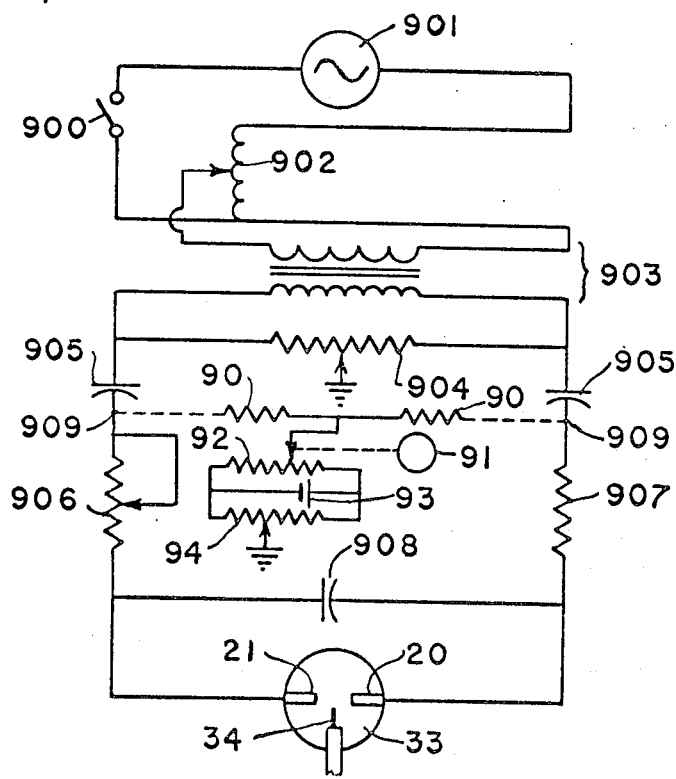

FIG. 8 shows a schematic circuit diagram for the AC potential supply for the vibrating fiber electrometer.

Figure 9:
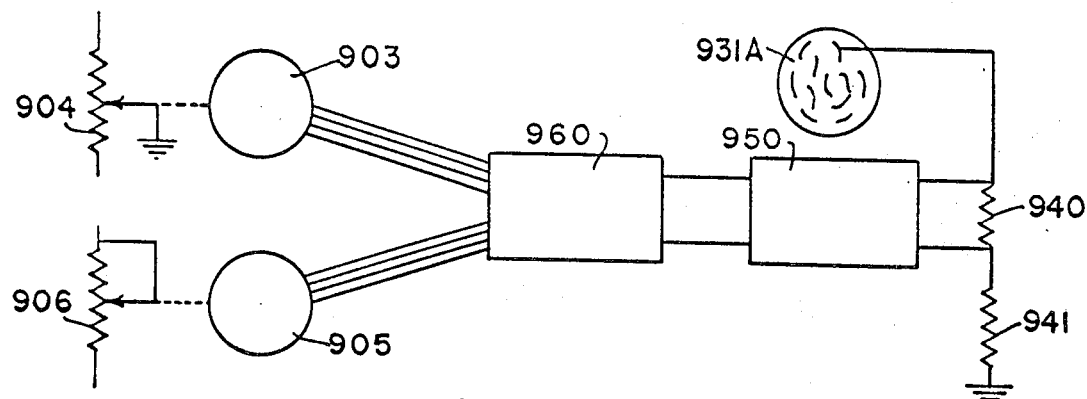

FIG. 9 shows one method for making automatic adjustment of potentiometers for AC null control.

FIG. 10 is a block diagram illustrating a system of monitoring the AC electrometer for analog recording.

Figure 11:
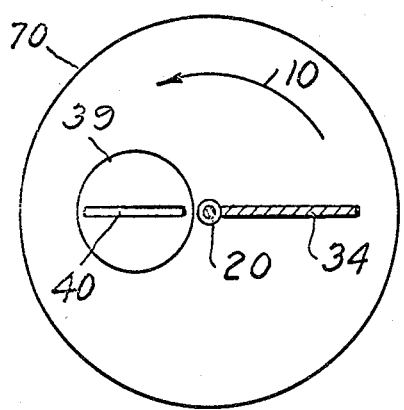

FIG. 11 is a device for changing analog to digital information and may be used as a rate of production indicator.

Figure 12:
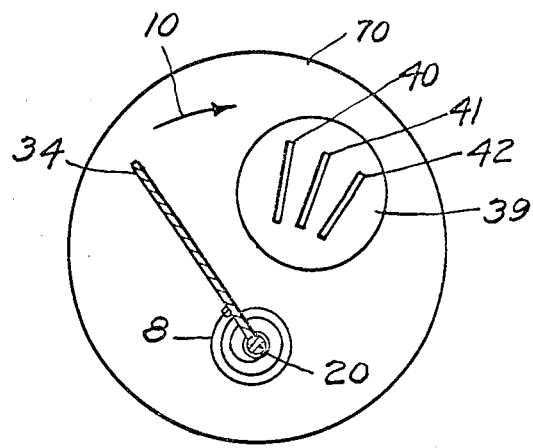

FIG. 12 is another optical signal device capable of use as a rate of production indicator.

Figure 13:
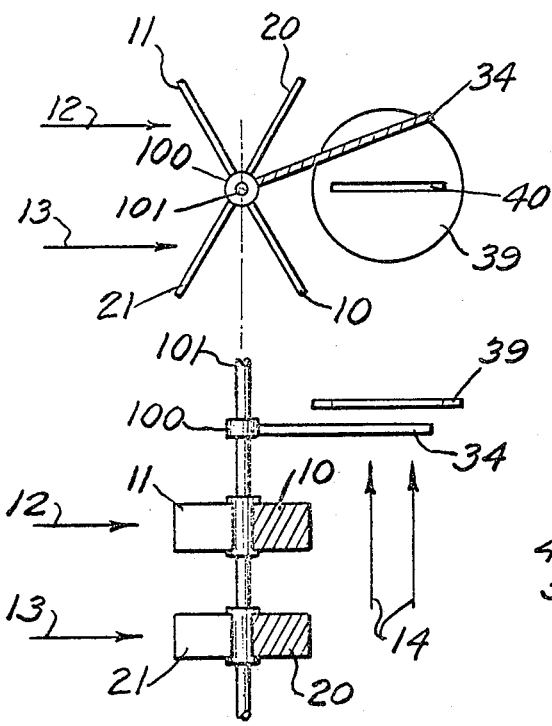

FIG. 13 is a radiometer application of the invention showing top and side view of a rotating system.

Figure 14:
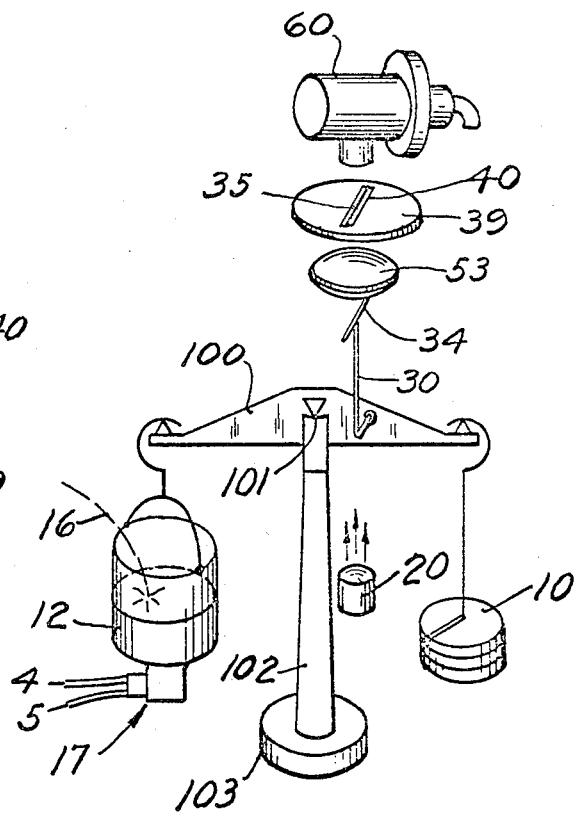

FIG. 14 is a gravitational field application of the invention for the measurement of force.

Figure 1:
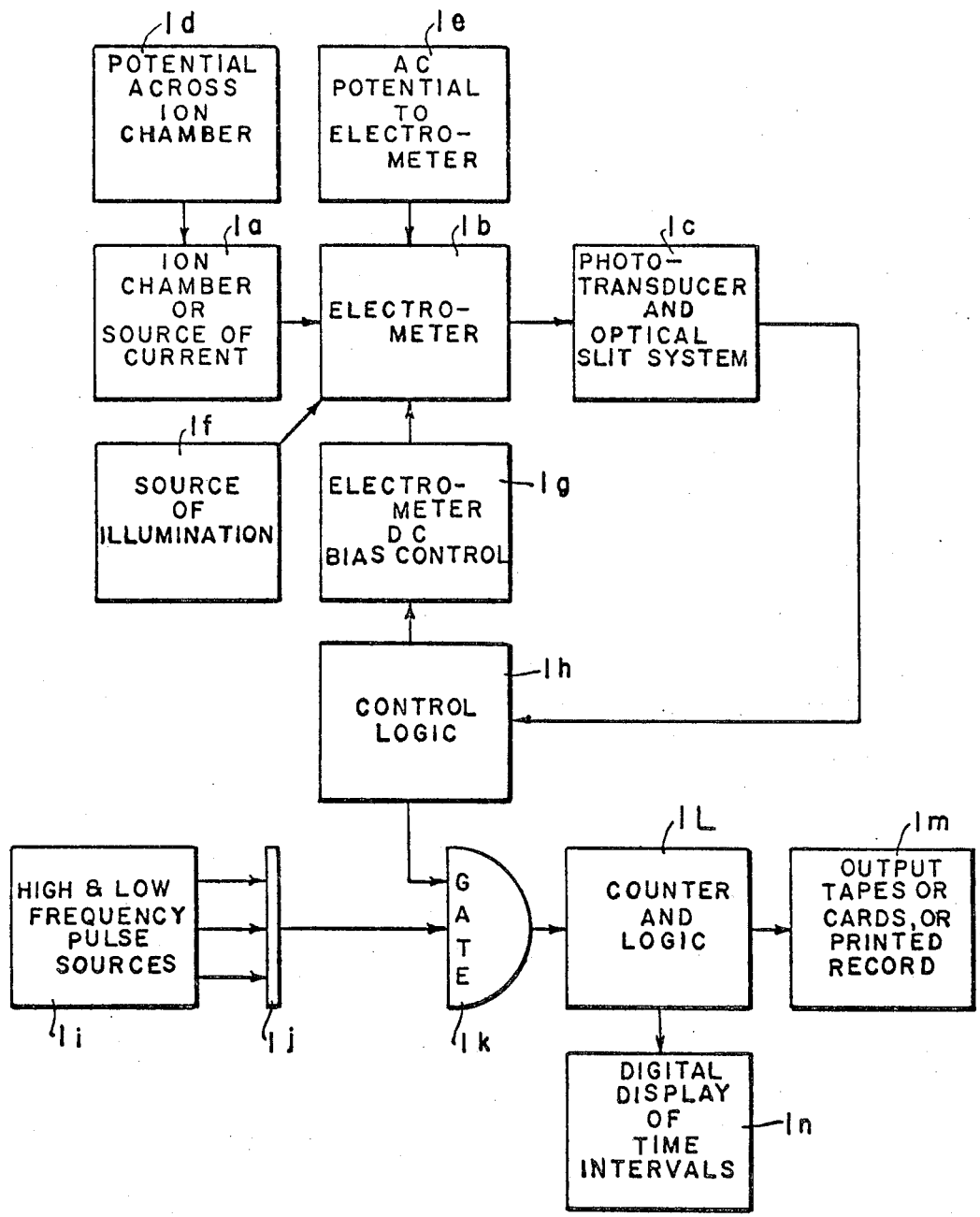
FIG. 1 shows a block diagram of a precision radiation measuring device.

Referring now to the block diagram of FIG. 1, a general purpose precision radiation measuring system is shown. It is comprised of the following:

1. an ion chamber, indicated at 1a,
2. an electrometer indicated at 1b,
3. a phototransducer and optical slit system, indicated at 1c,
4. a DC potential for the ion chamber, indicated at 1d, 5. an AC potential for the electrometer, indicated at 1e,
6. a source of illumination for the optical system, indicated at 1f,
7. a DC bias potential and bias control for the electrometer, indicated at 1g,
8. a control unit containing logic to control the electrometer as well as the the systems time interval measuring units, indicated at 1h,
9. high and low frequency pulse sources, indicated at 1i,
10. an OR gate to pass one of the selectable frequencies, indicated at 1j,
11. an AND gate for passing pulses to the counter during the time interval which is to be measured, indicated at 1k,
12. the primary counter and associated logic, indicated at 1L,
13. output instrument or instruments for recording the time intervals, indicated at 1m,
14. a visual display of each time interval reading may be employed, indicated at 1n.

Figure 2:
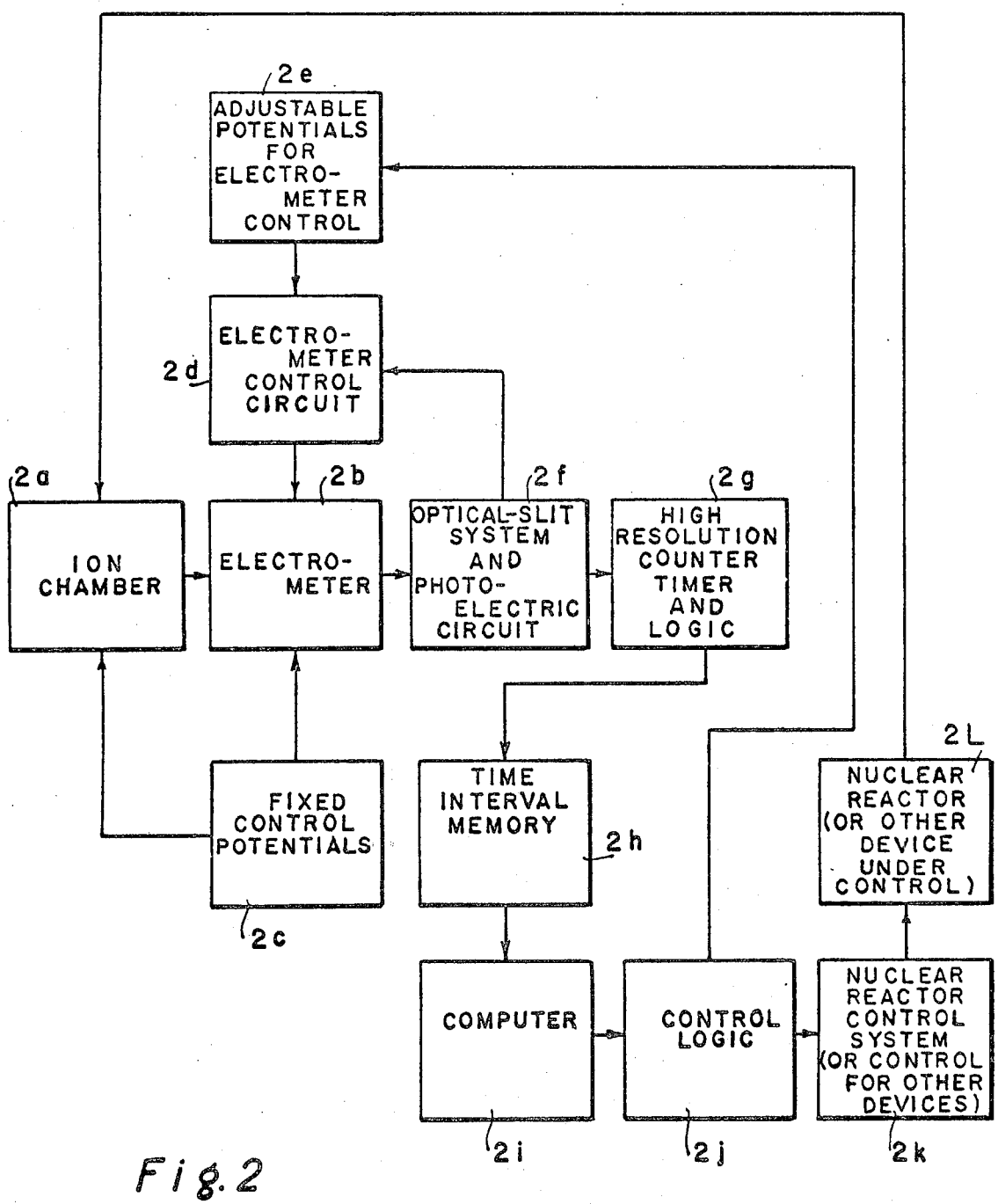
FIG. 2 is a block diagram illustrating the basic components of a system suitable both for nuclear reactor flux level measurement and power output control.

In FIG. 2 the digital electrometer scaler, adapted for use as a control system, is seen to comprise the following:
1. an ion chamber, indicated at 2a,
2. an electrometer, indicated at 2b,
3. a source of fixed potentials for control of the electrometer and ion chamber, indicated at 2c,
4. an electrometer control circuit, indicated at 2d,
5. the adjustable bias potentials for electrometer control, indicated at 2e,
6. an optical-slit system and a phototransducer assembly, indicated at 2f,
7. a high resolution counter-timer, and logic at 2g. The logic performs those functions previously described for FIG. 1 at 1h, 1i, 1j, 1k, and 1L.
8. a time interval memory, indicated at 2h,
9. a computer unit, indicated at 2i,
10. control logic responsive to the photoelectric signals for control of electrometer potentials as well as the control of a nuclear reactor or other device, indicated at 2j.
11. a control system, which may be a set of control rods, a water dumping system or a scram control—in the case of a nuclear reactor; or more generally, a control device for other systems, indicated at 2k.
12. a nuclear reactor or other device under control, indicated at 2L.

Each of these components will be considered in more detail after a description of the electrometer itself.

The Shonka electrometer has recently appeared on the commercial market bearing the name of its designer. It is a highly sensitive quartz fiber instrument of rugged design and as such is desirable for reactor control applications. In conjunction with the novelties of this invention, it may also serve as a general purpose, high precision radiation measuring instrument. The heart of this binant electrometer employs a conducting quartz fiber which is clamped at one end but free to vibrate on the other. The free end is mounted so it may vibrate in an alternating electric field maintained between two fixed electrodes or binants. The quartz fiber needle will vibrate in the AC field if either of two conditions is met:
1. the fiber bears an impressed DC potential, or if
2. there is more AC potential on one binant than the other.

But if neither of these conditions obtain, the quartz fiber or needle will be at rest, in both AC and DC equilibrium in the AC field. It may be noted that a DC bias potential is sometimes applied, not directly to the fiber as in (1) above, but is superimposed upon the AC potential applied to the binants. This has the effect of producing more potential on one of the binants than the other. Either of these two biasing methods may be used in the automatic operation of the electrometer.

Under automatic operation, the eyepiece reticule, against which one ordinarily observes the quartz fiber either at rest or fanned out in vibration, is replaced with a single optical slit, and if suitable control is employed, the Shonka electrometer may be operated on a fully automatic basis. The single slit may be so adjusted that the real image of the electrometer needle is focused on the slit when the needle is at rest in the AC field.

Although the Shonka electrometer is supplied for commercial use with a reflecting mirror-optical system, it has been found that a refracting lens system gives more positive operation with this photoelectric-optical-slit method of readout which is to be described. It may be noted that either mirror or lens system may be employed with this invention.

With a single slit-optical system, used in conjunction with the Shonka alternating current field electrometer, control circuitry becomes simplified since every reading with this instrument, after the initial reading, is a radiation measurement. This contrasts favorably with respect to the older, double-slit, aforementioned patent publication, which double slit system requires circuitry for distinguishing four types of measurements.

The structure shown in FIGS. 3 and 4 show two of various arrangements of ion chamber, electrometer, photomultiplier and optical system. Electric charge from the ion chamber, electrometer, photomultiplier and optical system. Electric charge from the ion chamber 43 (FIG. 3 only) to the electrometer quartz fiber needle, the end view of which is shown at 34, causes the needle, which initially oscillates between positions 35 and 31 (FIG. 4 only), to come to an equilibrium or rest position. The charge-biased needle oscillates because the AC field which is produced by applying an alternating current through wires 36 and 37 to the electrometer binant electrodes at 20 and 21. In FIG. 3 is shown a supporting base 30 which carries a source of illumination at 31. (This source of illumination is not shown in FIG. 4.) The electrometer housing 33 permits light incident on the quartz fiber needle 34 to reach the lens 53. The lens is so adjusted that the real image of the fiber needle is focused on the optical slit 40, contained in the mask 39. The mask containing the optical slit is in the focal plane of the lens 53; a photomultiplier tube contained in the housing 60 is thereupon illuminated by light proceeding through slit 40.

In FIG. 4 the optical path is increased by employing prisms 54 and 55. The housing 58 holds the electrometer housing 33. Support 61 holds the optical slit mask 39 in related operating adjustment to the photomultiplier housing 60. Support 61 also holds prism 54. Support 62 can be seen to hold prism 55 in addition to a housing for lens 53. The optical path 10 is indicated by the dotted line.

In FIG. 3, housing 137 holds the optical slit mask 39 in the plane of focus of the real image of the needle 34. Although the diagrams show lens 53 employed to form this real image, it might have been accomplished by means of a reflecting mirror arrangement as used in the commercially available Shonka electrometer.

In FIGS. 5, 5A, and 5B is shown a mask 39 and an optical slit 40, together with a superimposed real image 34 of the electrometer needle. The optical slit may be fixed or adjustable. The slit, if fixed, is ruled on an opaque mask. The mask may be a glass reticule made opaque by coating. The coating may be a metal, such as copper and silver, sputtered onto the glass. The ruling is usually machine controlled, thus removing the coating to any desired specification of width.

FIG. 5 shows an optical slit in adjustment with the real image of the electrometer needle in its rest position and blocking out most of the illumination. When the needle is vibrating in simple harmonic motion the amount of illumination that reaches the slit depends upon the amplitude of the vibration thereby determining the time-duration of light flux blockage at the slit. However, if the needle is in circular motion, then its angular velocity or frequency of rotation determines the time duration of light flux blockage at the slit.

FIG. 5A shows an adjustable, mechanical slit, desirable for the practice of this invention, in that it may be opened, as shown, to facilitate one's viewing and adjustment of the real image of the electrometer needle.

FIG. 5B shows the adjustable slit of FIG. 6 in a rotated position to further facilitate viewing the real image of the electrometer needle and for making adjustments of the optical system.

One may employ a ramsden eyepiece (not shown in the drawings) for viewing the optical slit and needle image; it is necessary, of course, to first remove the photomultiplier and the photocell housing, or the fiber optics, as the case may be, from its position above the optical slit. Then a ramsden or equivalent eyepiece is set in place above the slit and adjustments may be made.

FIG. 6 shows two fixed slits 40 and 60, arranged on mask 39. The auxiliary slit 60 is perpendicular to, but also may be at an angle with relation to the principal slit 40. The auxiliary slit is usually narrower than the principal one, since its purpose is to aid the eye to locate the image of the needle and in positioning mask 39 while making initial adjustments. The initial adjustment of mask 39 requires that when the image of the needle is at mechanical rest, that is, at AC and DC null, it should be in some degree of overlapping relationship with slit 40.

FIG. 7 shows three sources of potential and three circuits useful in operating the system. At 500, the ion chamber potential is shown. The ion chamber is comprised of the chamber itself at 43 holding a collecting electrode 544 by means of a double circular insulator 541 and 543. To a conducting ring 542, supported between the high dialecic insulators 541 and 543, is attached the grounded end of the ion chamber potential 500. The high side of this potential is placed on the outer wall of the chamber.

Ions are produced in the chamber by incident radiation, 577, from source, 576, partially surrounded by shield, 575. Low radiation level source material may be conveniently placed within the ion chamber.

A small relay with closing coil shown at 534, and moving armature at 512, fits inside the electrometer case, 33, adjacent to the binant electrometer shown at 550. This relay armature carries a small contactor, 513, adjusted to make and break contact with the collecting electrode, 544, of the ion chamber. Contactor 513 carries a potential from source 510 which is adjustable through potentiometer 511. This biasing potential is capable of setting the electrometer needle, 34, in oscillation when the needle is in an AC field.

Another potential at 530 controls relay coil 534 and is capable of removing contactor 513 and thus removing the source of bias 510 from the electrometer-ion chamber-conducting electrode comprised by 34 and 544 in connection.

It may be noted that the bias supplied by potential source 510 must be opposite to the change collected by the ion chamber due to the impressed potential from source 500.

The mode of operation of the electrometer in conjunction with the single-slit-photoelectric arrangement will now be described.

Referring to FIG. 7, the electrometer quartz needle 34 and ion chamber collecting electrode 544 are permanently connected. Together they constitute the systems charge-holding conductor. This conductor may receive charge in two ways. Either from the ion chamber or through contactor 513 from potential source 510 which is adjusted by potential divider 511.

After contactor 513 is withdrawn from the charge-holding conductor 34–544, charge produced in the ion chamber 540 due to radiation 577 from source 576 in shield 575 is collected onto the charge-holding conductor system. On the other hand, when contactor 513 is in connection with the charge-holding conductor 34–544, the charge from the ion chamber leaks off to the ground through potential divider 511, and the charge-holding conductor system is held at a fixed bias potential determined by potential source 510 and potentiometer 511.

If we suppose that a negative charge is left on the charge-holding conductor 34–544 when relay coil 534 becomes energized, thus removing contactor 513 from 34–544, then a positive change from ion chamber 43 collected at electrode 34–544 will cause the negative charge thereon to be neutralized, supposing that charge from the ion chamber is permitted to collect over a sufficiently long period of time.

When this balance of charge is effected and even prior to this time when the vibration amplitude of needle 34, FIG. 7 is sufficiently decreased, the real image of the electrometer needle will be in focus over the optical slit 40 (FIG. 3 or 4) for a sufficiently long time duration to produce a photoelectric signal. Note that this signal is amplitude dependent. This photoelectric signal in photomultiplier circuit ($1i$ of FIG. 1), in turn energizes relay 533 thereby deenergizing coil 534 by the removal of potential 530. Immediately thereupon negative biasing charge is returned to the charge-collecting conductor 34–544 and needle 34 resumes its state of oscillation. In this manner the system operates continuously, first charging the conductor and needle and then permitting ions of opposite charge from the ion chamber to collect on the charge-holding conductor.

It is clearly evident then in a series of such measurements the same electric signal that energizes relay 533 may also operate a time-measuring system to indicate the time interval, $\Delta t$, required for the charge from the ion chamber to balance the known initial biasing charge that is placed on the charge-collecting conductor 34–544 from source 510. Basically, the current, $i$, from the ion chamber may be expressed in terms of the time interval, $\Delta t$, required for the equal and opposite potential, $\Delta V$, caused by equal and opposite charge $\Delta Q$ (described above) to balance one another.

$$\text{Thus } i = \frac{\Delta Q}{\Delta t} \text{ and } i = C \frac{\Delta V}{\Delta t},$$

where $C$ is the capacitance of the charge-collecting conductor 34-544.

We now return to a description of the system as a whole. Referring now to FIG. 2, block 2L symbolizes a nuclear reactor or other type of device, as, for example, a Production Process. Block 2k indicates a control device for 2L. In the case of the nuclear reactor, 2L symbolizes not only control rods but also an electromechanical assemblage capable of maintaining any desired reactivity in the reactor core. An on-line computer at 2i not only permits the control of the reactor to any desired level of power output but also makes possible a complete analysis of core power distribution. In addition, it is capable of generating physics data and plant performance data for measurement, control and production of nuclear power.

For reactor application a suitable type of ion chamber tube may be employed at 2a (e.g., the Westinghouse Compensated Ionization Chamber WL-6377). It may be mounted in or near the core lattice for continuous monitoring of neutron flux levels. Several such ion chamber type tubes may be employed in conjunction with a given reactor core. In FIG. 2 it is seen that reactor 2L connects back to ion chamber 2a. This link symbolizes the neutron flux level within the reactor core, at any instant, producing current with the ion chamber. Control unit 2k is effective for removal or injection of control rods in the reactor lattice in response to the ion current levels maintained in the chamber by the neutron flux levels in the core.

The on-line computer 2i is usefully employed to receive and store in memory flux level information in the form of digital time interval readings. It is capable of output signals to control unit 2i which in turn controls both the electrometer bias potentials at 2e as well as the reactor-power levels by means of control 2k.

Referring to FIG. 1, a pulse source 1i is capable of outputting several frequencies. More specifically, a high and low frequency, at a minimum, are desirable for the general run of applications. The utility of the low frequency is seen in a system that operates on an intermittent basis. For example, if a system is to be used for measuring the half life of longer half lived isotopes, operation on an intermittent basis is desirable. During the intervals when measurements are not taken it is desirable to keep an accurate meause of this "off" time. For the off time measurement, then, the pulse source 1i is operated at the lower frequency. The gate shown at 1i, is controlled by logic 1h thereupon permits the primary counter to collect pulses at a slower rate. Thus the lower frequency prevents the accumulation of a number of counts beyond the primary counter capability. However, when it is desired to measure radiation where the time intervals are short, the high frequency pulses from source 1i are used. Fast counting with higher frequencies permits one to obtain in a short counting interval as many significant figures as possible.

It is understood that the control logic indicated at 1h and 1L in FIG. 1 are not entirely separate units. In reality they represent the logic of the entire system but are diagrammed as separate blocks so that the flow of control may be more easily represented.

The primary counter reading may be transferred out into a parallel, buffer memory, before it is read out into more permanent type of record; or it may be read out serially. However, whatever method of read-out is employed a minimum (but constant) interval of time is lost. This dead time, at most, is of the order of one-half second. In one instrument, a 0.75 sec. counter has been employed to inhibit the primary counter during a 0.75 sec. interval subsequent to the readout of the primary counter. Apart from this, the Primary Counter counts continuously. The dead time correction for the Primary Counter is updated at a later time in the system sequence.

In FIG. 8 is shown a schematic circuit diagram for an AC potential supply for the binants of the electrometer. The Shonka electrometer under manual operation does not require precise AC zero adjustment nor precision phase adjustment, since a reversal of the motion of the pattern in the eyepiece indicates to the operator the exact instant for the termination of a time interval reading. Nonetheless, under automatic, continuous operation it is required that the same sharpness of focus be maintained througout a series of measurements. This sharpness of focus is controlled both by a phase adjustment 906 as well as by the ground adjustment 904 of FIG. 8.

Indicated at 901 in FIG. 8 is a source of AC power which may be conveniently 60 Hz 125 volts. A variac is shown at 902. It may be employed as the AC power level control, supplying potential to the primary of the step-up transformer 903. For the Shonka electrometer the output of this transformer need not exceed 500 or 600 volts. The AC ground adjustment at 904 together with the phase control at 906 are together important for maintaining the same sharpness of focus, as we have said, of the electrometer needle when it is at rest in the AC field.

At 905, isolation capacitors are shown. Capacitor 908 (about 30 mmf) slightly loads the circuit. The electrometer is shown at 33 with connections for the circuit to its binants 20 and 21. The quartz fiber, the vibrating member of the elctrometer is shown at 34.

Various methods may be employed to stabilize the AC null adjustment of the electrometer. For example, temperature control of the critical circuit elements of FIG. 8 will hold the electrometer in AC null adjustment.

Another method is shown in FIG. 9. Suppose that DC bias is removed from 34-544, the electrometer's collecting electrode of FIG. 7, so that the needle 34, is at AC null, except for the final adjustment of ground at 904 and phase at 906 (FIGS. 8 and 9). At 931A FIG. 9, a photomultiplier tube is shown connected through resistors 940 and 941 to ground. A differentiator circuit at 950 is employed to sense the rate of change of current in resistor 940. Assume that the output of 950 is positive when $di/dt$ of resistor 940 is increasing; is negative when $di/dt$ is decreasing and is zero when $di/dt$ is zero. At 960 is indicated a polarity sensing circuit, a motor drive, and circuit logic for alternately driving, first motor 903 and grounding potentiometer 904, and then motor 905 together with phase potentiometer 906. (Potentiometers 904 and 906 are also shown in FIG. 8.)

Basically the circuits of 960 do the following: they set in motion alternately motor 903 and 905; if $di/dt$ is positive they reverse the direction of drive of the motor; if $di/dt$ is negative they continue to drive the motor; if $di/dt$ is zero they stop the motor. Logic at 906 is also programmed for two or more successive, double adjustments of potentiometers 904 and 906, first driving one, then the other; the adjustments occur automatically. Adjustments may be programmed to occur between a batch of readings of the instrument or even to interrupt a series of readings. Such an arrangement will maintain the instrument continuously in AC null adjustment.

While the novelties of the single-slit-real-image-phototransducer system are most useful for obtaining digital readout of data from the vibrating quartz-fiber electrometer, it may also be used for obtaining analog readings. A block diagram is shown in FIG. 10.

For analog operation, needle 34 (FIG. 7) is maintained at AC null during the time of ion collection from chamber 43. Normally, as ions are collected, the charge placed on the needle causes it to vibrate in the AC field. This permits more light flux to strike the phototransducer and more current to pass through resistor 940, FIG. 9. By monitoring this current increase by the employing of a constant reference voltage parallel to 940, and by sampling the potential difference between the reference voltage and the voltage across 940; and further, by employing an amplifier at the lower ends of resistor 940 and the reference voltage, the voltage difference may be amplified and used to drive servo motor, 91 of FIG. 8, thus offsetting the increase of charge on the needle so that the needle may be maintained at rest with its image overlapping the slit.

It should be noted that in this application of the invention, modulation of the light beam results by means of circuitry which constrains the electrometer needle to maintain a low amplitude vibration thereby minimizing the current that flows in the photoelectric circuit. In this application instead of producing a photoelectric signal at a point in time there is produced a continuous photoelectric current response to a diminished level of light flux. But it should be noted that there is a continuously varying amplitude modulation of the light flux or beam, because of the vibrating needle, which continuously rides control of current in the photoelectric circuit.

This technique of generating drive for a servo motor so as to maintain a bridge in balance is well known to the art and is symbolized at 11g of FIG. 10.

The servo balance motor is shown at 91 in FIG. 8. It drives potentiometer 92 across which is maintained a constant DC potential, 93. Resistors 90 are equal in value and supply a high impedance path between points 909. With potential source 93 connected with the correct polarity orientation, this circuit will continuously maintain the electrometer needle at AC null. The dotted circuit between points 909 of FIG. 8 is symbolized in FIG. 10 at 11f. It may be noted that there are other possible circuit arrangements that could be used to obtain continuous AC null for analog recording.

A strip chart recorder is shown, at 11h, of FIG. 10. It may be driven by the same motor, 91, FIG. 8, which is used to maintain the electrometer needle at AC null. By the employ of two limit switches at each side of the strip chart, one may periodically (when the recording needle reaches its limit) return the strip chart needle as well as potentiometer 92 of FIG. 8 to their initial positions. Simultaneously with this rebiasing operation, contact point 513 of FIG. 7, may be brought into contact with ion collecting electrode 34-544, permitting the ion charge collected from the chamber to leak to ground. After this double resetting operation the left limit switch removes contactor 513 from the collecting electrode and the strip chart continues analog recording.

FIG. 11 shows a plan view of an optical, analog to digital converter that may be used, for example, as a rate of production indicator. The end of a rotating shaft is shown at 20. The shaft carries an arm 34 rotating in the plane of the circle, 70 in direction, 10. An optical slit, 40, in a mask, 39, which is either close enough to arm, 34 that optical flux incident on the slit and a phototransducer (not shown) may be interrupted, or a real image of the arm 34 produced at optical slit, 40 may be employed to produce phototransducer signals.

As a rate of production indicator the rotation of the shaft is measured by counting the shaft revolutions and by driving the shaft at a rate proportional to the speed of product production.

In applications of this device light modualtion may be utilized that is purely frequently dependent. Thus a signal may be generated in the photoelectric circuit when the frequency of rotation falls below some desired rate.

FIG. 12 shows another form of a rate of production indicator that employs more than one optical slit. The rotating shaft end is shown at 20. The shaft carries arm, 34 which is attached to a spring return mechanism shown at 8. In this device the production rate is proportional to the angle of deflection of arm 34. The circle at 70 shows the plane of motion of the deflecting arm, 34. Mask 39 contains optical slits 40, 41 and 42. The plane of the slits may be close enough to arm 34 to permit the arm itself to interrupt light flux at the slits or, if at a distance, the real image of arm 34 may be employed to obtain photoelectric signals. Alternately, mask 38 may be made adjustable so that with only one slit at a given deflection may be monitored and a given production rate may be maintained.

FIG. 13 shows a plan view and a side view of a radiometer like structure. Shaft 101 carries two sets of vanes upon which radiant flux at 12 and 13 impenges as in a radiometer. Vane pairs 10 and 11 as well as pairs 20 and 21 are coated on one side so that the radiant flux at 12 and/or 13 can drive shaft 100 in rotation. The coating may be opposite on the pairs (not shown in FIG. 13) so that the shaft rotation effected by the pairs, is in opposition. For light pressure measurements this assembly of vanes should be maintained in a vacuum. The shaft also carries an arm, 34 which is able to modulate light flux shown at 14, illuminating slit 40. Collar, 100 mounts arm 34 and permits its adjustment.

Suppose radiant flux 12 is a constant, standard known source of flux, capable of producing a given rotation of shaft, 100. An unknown flux at 13 can be measured if either the real image of the arm or the arm itself interrupts light flux 14 incident upon optical slit, 40. (A phototransducer is not shown in FIG. 13) It is understood that a counter system be employed to count the flux interruptions occurring at the slit and thus to obtain time interval measurements and rates of rotation. From these the flux measurements themselves are obtained.

In this application a time-dependency of the photoelectric signal is obtained which is purely frequency-dependent so that a signal is produced for a shaft rotation rate below a given adjustable level.

FIG. 14 shows application of this method of measurement to a gravitational field. A rigid bar at 100 is supported by a fulcrum at 101, a support at 102 and a base at 103 in a gravitational field. A known force at 10 acts on the rigid bar and tends to produce rotation but is offset by the force produced by a collector system at 12. A flow of fluid (a liquid or gas) is merely symbolized by the dotted flow line at 16, directed to the collector 12.

Attached to bar 100 is a needle 34 connected by a rigid arm 30. Lens 53 focuses light from source 20 on slit 40 held by mask 39. The optics are so adjusted that the real image 35 of needle 34 will appear in overlapping relationship to slit 40 when the torques produced by the two forces are in balance. Damping, not shown, may be applied to the system. The optical system between light source 20 and phototransducer 60 is shown in separated (exploded) relationship.

This invention is also meant to encompass an optical slit-photomultiplier-gravitational field system for automatic flow measurement in which the needle itself is large enough to interrupt light flux at the optical slit without the intermediary of its own image. It should be clear from FIG. 14 how signals derived from phototransducer 60 may be used to make continuous force measurements and flow measurements. For this purpose a release valve at 17, electrically operated through connections 4 and 5 and controlled by the phototransducer signal at 60 permits evacuation of the collected fluid at 12. This rotates bar 100 and arm 30 thus removing the optical signal from phototransducer 60 which, in turn, closes valve 17, permitting the collection of a new sample of fluid at 12. Measurement and recording of the time interval of each sample collected permits a continuous monitoring of the flow rate at 16.

Having presented my invention, what I claim is:

1. An optical transducer system consisting of:
   a. a source of electromagnetic flux,
   b. an object illuminated by said source of flux, said object being an arm in simple harmonic motion,
   c. a focusing means, a real image of said object,
   d. a mask, opaque to said flux, containing an aperture,
   e. said mask, in the focal plane of said focusing means together with said real image so that said aperture and said real image may come into overlapping relationship,
   f. a transducer positioned adjacent to said aperture to receive said electromagnetic flux from said aperture,
   g. a frequency-amplitude dependent transducer signal, which is also time-duration sensitive generated responsive to the presence of said real image of said object at said aperture resulting from the change in said flux reaching said transducer and from the time-duration of said change.

2. In an optical transducer system as described in claim 1,
   a. said object illuminated by said flux being a needle of an alternating current electrometer.

3. An optical transducer system consisting of:
   a. a source of electromagnetic flux,
   b. an object illuminated by said source of flux, said object being an arm in circular motion,
   c. a focusing means, a real image of said object,
   d. a mask, opaque to said flux, containing an aperture,
   e. said mask, in the focal plane of said focusing means together with said real image so that said aperture and said real image may come into overlapping relationship,
   f. a transducer positioned adjacent said aperture to receive said electromagnetic flux from said aperture,
   g. a frequency-amplitude dependent transducer signal, which is also time-duration sensitive generated responsive to the presence of said real image of said object at said aperture resulting from the change in said flux reaching said transducer and from the time-duration of said change.

4. An optical transducer system consisting of:
   a. a source of electromagnetic flux,
   b. an object illuminated by said source of flux, said object being in elliptic motion,
   c. a focusing means, a real image of said object,
   d. a mask, opaque to said flux, containing an aperture,
   e. said mask, in the focal plane of said focusing means together with said real image so that said aperture and said real image may come into overlapping relationship,
   f. a transducer positioned adjacent said aperture to receive said electromagnetic flux from said aperture,
   g. a frequency-amplitude dependent transducer signal, which is also time-duration sensitive generated responsive to the presence of said real image of said object at said aperture resulting from the change in said flux reaching said transducer and from the time-duration of said change.

5. In combination, a measuring system comprising:
   a. an indicating instrument having a movable element, also called a needle, mounted within a field of force,
   b. said field of force capable of producing a vibratory motion of said movable element in response to a first and second force,
   c. means for applying said first force to said movable element and
   d. means for applying said second force to said movable element,
   e. said first force resulting from the application of known quantities to said movable element,
   f. said second force resulting from the application to said movable element of unknown quantities to be measured,
   g. said first and said second forces of opposite kinds capable of annulling the effect of one another when they are of equal magnitudes,
   h. monitoring apparatus for determining the condition of movement of said moving element and the time when said first and said second force are equal to one another,
   i. said monitoring apparatus comprising,
   j. an optical system consisting of a source of illumination, a focusing device, a mask containing an aperture of predetermined outline,
   k. said illumination source, optical system and mask to cast a real image of said needle on said mask in overlapping relationship to said aperture,
   l. a transducer positioned adjacent to said aperture to generate a frequency-amplitude dependent phtotoelectric signal responsive to the presence of the real image of said needle at said aperture, m. said frequency-amplitude dependent photoelectric signal being sensitive to the time duration of change of illumination reaching said aperture, n. a recording means, for recording the presence of said real image of said needle at said aperture whenever said frequency-amplitude dependent photoelectric signal is produced, o. means responsive to said photoelectric signal for recording the effect of said second force, 6. In a measuring system according to claim 5,
a. said mask containing apertures.

7. In a measuring system according to claim 6, said mask containing:
a. a first aperture,
b. a second aperture not parallel to the first said aperture.

8. In a measuring system according to claim 6,
a. said mask containing an aperture adjustable.

9. In a measuring system according to claim 6,
a. said mask capable of being rotated.

10. In a measuring system according to claim 6,
a. means responsive to said photoelectric signal to apply a new first force to said movable element and to permit a successive application of said second force to said movable element and thus continuously to take measurements with the system.

11. In a measuring system according to claim 6, said recording system comprised of:
a. a counting means,
b. a source of electric pulses of known frequency to be counted,
c. time recording equipment to record the counted pulses in response to said photoelectric signal.

12. In a measuring system comprising:
a. an indicating instrument having a movable element, also called a needle, mounted within a field of force,
b. said field of force capable of producing a vibratory motion of said movable element in response to a first and to a second force,
c. means for applying said first force to the movable element and
d. means for applying said second force to the movable element,
e. servo means of control for continuously offsetting the effect of said first force,
f. said first force resulting from the application of known quantities to the said movable element,
g. said second force resulting from the application to the movable element of unknown quantities to be plotted,
h. said first and said second force of opposite kinds capable of annulling the effect of one another,
i. and said first and second force under the influence of said servo control means capable of near continuous balance so that said needle is kept at a minimal vibration in said field of force,
i. monitoring apparatus for determining the condition of movement of said movable element,
k. said monitoring system comprising:
l. an optical system, a source of illumination, a focusing device, a mask containing an aperture of predetermined outline,
m. said illuminating source, said focusing device and said mask being held in position to cast a real image of said needle in overlapping relationship to said aperture,
n. a transducer adjacent to said aperture to generate a frequency amplitude dependent photoelectric signal responsive to the time-duration of said real image of said needle at said aperture;
o. said frequency-amplitude dependent photoelectric signal being connected to drive said servo means to control effect of said first force and thus to maintain said needle in balance with its image at said aperture and at a minimal state of vibration in said field of force,
p. an analog recorder connected to said servo control for plotting said unknown quantities due to the effect of said second force,
q. switching means to initiate readjustment of said means for applying said first force to said moving element, and for readjustment of said analog recording means so the indicating means of said analog recorder remains within the range of limits of said analog recorder.

13. In a measuring system as described in claim 12,
a. said indicating instrument being an electrometer having a movable element, also called a needle, mounted within an electric, alternating current field of force,
b. said first force being due to an electric change from a direct current source of potential,
c. said second force being due to electric charge flowing to the collecting electrode of an ionization chamber,
d. said collecting electrode being connected to the said movable element of said electrometer.

14. A method for measuring force, said method comprising:
a. establishing a field where forces can react,
b. placing an object capable of motion in said field of force,
c. applying a first, known force to said object, so that the object acts and is acted upon in said field of force,
d. creating a flow of said object of a second, unknown force, so that the said object again acts upon the field of force and is acted upon by said field of force,
e. said first force being opposite to said second force and thus being capable of annulling one another when they cause a balance,
f. applyig a monitoring device to determine the time of balance of said two forces,
g. said monitoring device being a needle or its real image fixed to and in motion with said object and, at balance, in overlapping relationship to an optical slit aperture,
h. placing a transducer adjacent to said mask so as to produce a frequency-dependent photoelectric signal or an amplitude-dependent photoelectric signal at the time of balance of said two forces,
i. said real image transducer signal connected to cause to record the measurement of the time of balance of said two forces,
j. said transducer signal to wipe out old force and to initiate new first force for measurement of a new second unknown force.

15. A method for measuring force according to claim 14, and comprising, a. said field where forces may react being a rigid shaft with vane structures mounted free to rotate on its axis, b. said object being a rotating arm mounted on said rigid shaft, c. said first force being a known light flux against a first set of vanes, d. said second force being an unknown light flux against a second set of vanes, e. said vanes being coated on one surface so that momentum may be transferred from radiant flux to said vanes so as to cause said shaft to rotate.

* * * * *